TAPERED INSULATED GATE FIELD-EFFECT TRANSISTOR

Filed Feb. 3, 1966

INVENTORS
GESINUS DIEMER
FELIX VAN DER MAESEN
BY
Frank R. Jenfari
AGENT

INVENTORS
GESINUS DIEMER
FELIX VAN DER MAESEN
BY
Frank R. Trifari
AGENT

United States Patent Office 3,436,620

Patented Apr. 1, 1969

3,436,620

TAPERED INSULATED GATE FIELD-EFFECT TRANSISTOR

Gesinus Diemer, Emmasingel, Eindhoven, and Felix van der Maesen, Geldrop, Netherlands, assignors to North American Philips Company, Inc., New York, N.Y., a corporation of Delaware Filed Feb. 3, 1966, Ser. No. 524,925

Claims priority, application Netherlands, Feb. 17, 1965, 6501946

Int. Cl. H01l *11/14*

U.S. Cl. 317—235 6 Claims

ABSTRACT OF THE DISCLOSURE

A field-effect transistor of the insulated gate type in which the thickness of the insulator increases in a substantially linear manner in a direction from one electrode to the opposite electrode. For a device operated in the depletion mode, the increase in thickness is from the source electrode to the drain electrode. For a device operated in the enhancement mode, the increase in thickness is from the drain electrode to the source electrode. Improved performance is obtained as a result of the field intensity being made more homogeneous in the semiconductive layer portion in which the current flows.

The invention relates to a semiconductor device comprising a semiconductor body provided with two connecting electrodes for passing a current through a layer-like portion of the semiconductor body between the connecting electrodes, said layer-like portion having an electrically insulating layer on which a control-electrode or gate electrode extends.

In such known semiconductor devices, in operation, a current passes, by the application of a voltage difference between the connecting electrodes, between said connecting electrodes through a layer-like portion of the semiconductor body located between said connecting electrodes, the thickness and/or the conduction of which is or are influenced by the control-electrode, which, together with the semiconductor body and the intermediate insulating layer, constitutes a capacitor. Because there is a potential gradient present between the connection electrodes due to which a current flows, the said influence depends upon the locus, i.e., the place where measured, between the connection electrodes. As a result thereof, in operation the field intensity in the layer-like portion depends also upon the locus between the connection electrodes.

The invention is based inter alia on the recognition of the fact that this locus-dependent field intensity is undesirable and can be avoided or at least reduced.

The invention has for its object to provide a semiconductor device of the kind set forth, in which said disadvantage does not appear or is involved at least to a reduced extent.

According to the invention a semiconductor device of the kind set forth is characterized in that the insulating layer between the connecting electrodes in a direction from one electrode to the other has a substantially linearly increasing thickness.

As will be explained more fully hereinafter it is thus possible to obtain a substantially completely locus-independent field intensity, that is to say a field intensity which has a substantially constant value from one electrode to the other throughout the layer-like portion of the semiconductor body, when the bias voltages at the electrodes are constant.

Such a constant field intensity is important inter alia because the transit time of the charge carriers between the electrodes is at a minimum with a constant field intensity. A constant field intensity therefore involves the possibility of a maximum frequency range.

Moreover, with a constant field intensity a great transductance $g_m$ is obtained already at low currents between the connecting electrodes; $g_m$ indicates the ratio between a variation of the current flowing between the connecting electrodes ($\Delta I$) due to a variation of the bias voltage of the control-electrode ($\Delta V_g$) and $\Delta V_g$, so that $$\Delta I = g_m \cdot \Delta V_g.$$

As a result, the semiconductor device can be driven effectively at low currents, so that heat dissipation is low.

Since the field intensity is constant, the local appearance of high field intensities and the resultant heat dissipation and the risk of break-down across an insulating layer or along the surface of the semiconductor body are avoided.

Said advantages are obtained by only a slight difference between the structure of a semiconductor body according to the invention and the known devices which difference may be easily applied during manufacture, the difference being said linearly increasing thickness of the insulating layer and a uniform thickness of the prior art device.

The invention is particularly important for TFT's (thin-film-transistors). Such transistors consist wholly or partly of a number of thin layers bearing on an insulating support. Therefore, an important embodiment of a semiconductor device according to the invention is characterized in that the electroded semiconductor body consists of an electroded semiconductor layer disposed on an electrically insulating support.

An embodiment of the semiconductor device according to the invention, which is particularly important for TFT's, is characterized in that the semiconductor body, at least that portion on which the two connecting electrodes are arranged, is homogeneously of the same conductivity type, in that means are provided to apply a voltage to one of the connecting electrodes (the drain electrode) with respect to the other electrode (the source electrode) in order to pass a current through the semiconductor body which current is mainly due to the fact that majority carriers travel from the source electrode to the drain electrode and in that there are furthermore provided means for applying a voltage to the control-electrode such that the potential of the source electrode lies between that of the control-electrode and that of the drain electrode and the current between the source and drain electrodes is controlled and in that the insulating layer between the source electrode and the drain electrode in the direction from the source electrode towards the drain electrode has a substantially linearly increasing thickness. In this embodiment the current between the source electrode and the drain electrode is controlled by reducing the concentration of free charge carriers near the surface of the semiconductor body between the source electrode and the drain electrode with the aid of the control-electrode. This reduction means that the cross section of the path which the current between the source and drain electrodes can cover is restricted. This is termed the "depletion mode."

A further embodiment of a semiconductor device according to the invention, particularly important for TFT's, is characterized in that the semiconductor body, at least the portion on which the two connecting electrodes are disposed, has a substantially intrinsic conduction, in that means are provided for applying a voltage to one of the connecting electrodes (the drain electrode) with respect to the other electrode (the source electrode), and to apply a voltage to the control-electrode with respect to the source electrode such that the potential of the drain electrode lies between that of the source electrode and that of the control-electrode and the concentration of free charge carriers in a surface layer of the semiconductor body located between the source electrode and the drain electrode is increased due to which a current passes through said surface layer between the source electrode and the drain electrode and in that the insulating layer between the source electrode and the drain electrode has a substantially linearly increasing thickness in the direction from the drain electrode towards the source electrode. In this embodiment the concentration of charge carriers in the vicinity of the surface is increased by means of the control-electrode, so that the conduction along said surface is improved. This is termed the "enhancement mode."

If the thickness of the insulating layer on the layer-like portion between the connecting electrodes approaches substantially zero in a direction towards one of said electrodes, any substantially linear gradient of the thickness of the insulating layer may yield satisfactory results. However, chiefly for manufacture-technical reasons the insulating layer will, in practice, have a finite thickness everywhere above the layer-like portion. In this case it is found that an insulating layer between the connecting electrodes with an increase in thickness by a factor of at least two in the direction from one connecting electrode to the other gives satisfactory results. Very good results have been obtained with an increase in thickness by a factor of at least 5 and at most 20.

It will be obvious that besides using the linear increase in thickness of the insulating layer, also by using simultaneously a suitable doping and/or shape of the semiconductor body, the aforesaid constant field intensity may be obtained.

The invention may furthermore be important for M.O.S. transistors (metal oxide semiconductor transistors, usually the insulating layer consists of an oxide). Such transistors comprise a semiconductor body, for example of silicon of one conductivity type, there being at a surface of the semiconductor body, for example by diffusion of a significant impurity, regions of opposite conductivity types to which the connecting electrodes are applied. In operation, a current passes between the connecting electrodes through a surface layer of opposite conductivity type joining said regions, the conduction of said layer being modulated by means of the control-electrode.

The invention will now be described more fully with reference to a few embodiments and to the drawings, in which FIG. 1 shows diagrammatically and partly in a cross sectional view an embodiment of a semiconductor device according to the invention, of which FIG. 2 shows a plan view.

Figure 1:
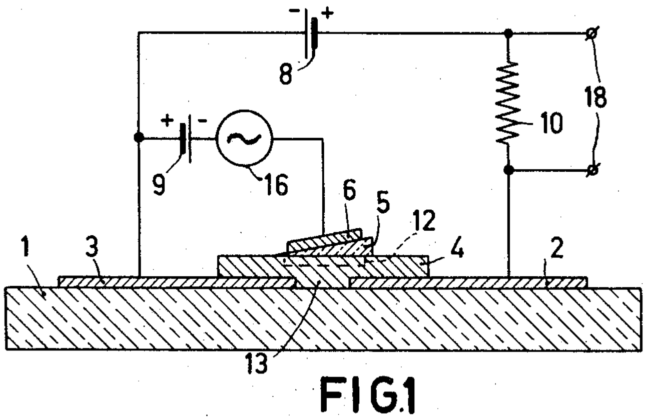
Figure 2:
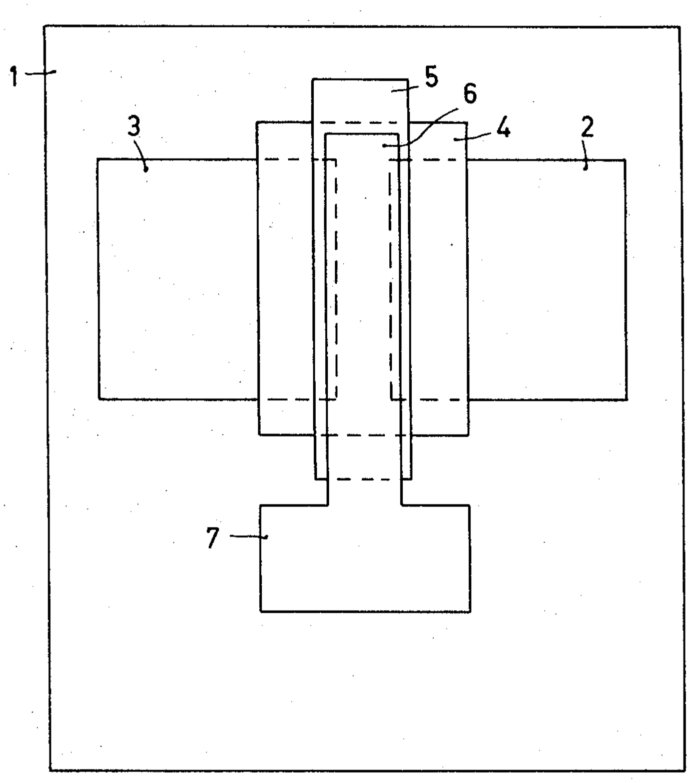

FIGS. 1 and 2 show a first embodiment of a semiconductor device comprising a semiconductor body 4, provided with two connecting electrodes 2 and 3 for passing a current through a layer-like portion of the semiconductor body 4 between the connecting electrodes, said layer-like portion being provided with an electrically insulating layer 5, on which a control-electrode 6 is provided.

According to the invention the insulating layer 5 between the connecting electrodes 2 and 3 exhibits a substantially linearly increasing thickness in the direction from one connecting electrode 3 towards the other connecting electrode 2.

The embodiment to be described is a TFT, in which the electroded semiconductor body consists of a semiconductor layer 4, applied to an electrically insulating support 1 and provided with electrodes 2, 3 and 6.

In the present embodiment the semiconductor body 4 has homogeneously the same conductivity type, that is to say n-type conductivity, while means (the battery 8 in FIG. 1) are provided for applying to the electrode 2, the drain electrode, a voltage which is positive with respect to the other electrode, the source electrode 3, a current being produced across the semiconductor body 4 mainly due to majority carriers, in this case electrons travelling in the direction from the source electrode 3 to the drain electrode 2. There are furthermore provided means formed by a battery 9 for applying to the control-electrode 6 a voltage which is negative with respect to the source electrode 3, while the potential of the source electrode 3 lies between that of the control-electrode 6 and that of the drain electrode 2 and affects the current between the electrodes 2 and 3. The insulating layer 5 has a substantially linearly increasing thickness in the direction from the source electrode 3 to the drain electrode 2.

The voltage of the control-electrode 6, which is negative with respect to the electrodes 2 and 3 and hence to the semiconductor body, repels electrons beneath the insulating layer 5, so that the concentration of electrons in a surface layer of the semiconductor body 4 beneath the insulating layer 5 is reduced, as well as the sectional area of the path of the current between the electrodes 2 and 3.

In the case of a homogeneous thickness of the insulating layer 5, the thickness of the surface layer with the reduced electron concentration is not uniform due to the potential drop in the semiconductor body 4 between the electrodes 2 and 3. The thickness of this surface exhibits a gradient corresponding to the potential drop in the semiconductor body 4, and the thickness of the remaining part of the semiconductor body 4 between the electrodes 2 and 3, through which current can still flow, exhibits a corresponding gradient so that no constant field intensity appears in the last-mentioned layer.

The thickness of the surface layer induced by the control-electrode 6 into the semiconductor body 4 depends furthermore upon the thickness of the insulating layer 5, since the control-electrode 6, the insulating layer 5 and the semiconductor body 4 constitute a capacitor. Owing to the linear increase in thickness of the insulating layer 5 according to the invention, an induced surface layer having a reduced electron concentration can be obtained with substantially constant thickness, despite the drop of potential in the semiconductor body 4 between the electrodes 2 and 3, so that a substantially constant field intensity appears in the remaining current-conveying layer between the electrodes 2 and 3, the advantages of which are described above. In FIG. 1 the broken line 12 indicates diagrammatically the induced surface layer with reduced electron concentration and the subjacent current-conveying layer is designated by 13.

The device shown in FIGS. 1 and 2 may be manufactured, with the exception of the insulating layer 5, wholly by the method usually employed for the manufacture of TFT's. The method may start from an electrically insulating support 1 of glass of dimensions of about 1 cm. x 1 cm. x 0.5 mm. By vapour-deposition of gold through a mask the electrodes 2 and 3 are applied thereto. The distance between said electrodes is about 20$\mu$. The electrodes may have dimensions of about 1 mm. x 1 mm. x 1,000 A. Then an n-type cadmium sulphide layer 4 is applied by vapour deposition through a mask. The cadmium sulphide layer 4 may have dimensions of about 1 mm. x 1.5 mm. x 2,000 A. and a layer resistance of about $10^6$ ohms/square.

The insulating layer 5, which has dimensions of about 28$\mu$ x 1.7 mm. in FIG. 2, may be obtained by vapour deposition of silica through an apertured mask. By providing the mask with a slide capable of closing the aperture of the mask and by removing this slide slowly from the aperture during the vapour deposition, for example by means of a micro manipulator, the wedge-shaped section of the insulating layer 5 of FIG. 1 can be obtained. The maximum thickness of the insulating layer 5 may be about 1.5μ. Above the intermediate space between the electrodes 2 and 3, that is to say above the portion of the semiconductor body through which the current passes, in operation, between the electrodes 2 and 3, the thickness of the insulating layer 5 increases from left to right in FIG. 1 from about 1,500 A. to about 13,000 A. This is an increase by a factor 8 to 9. It has been found that it is to be preferred to choose a factor exceeding 2 and very good results have been obtained by a factor of at least 5 and at the most 20.

The insulating layer 5 is provided with the control-electrode 6 by vapour deposition of a gold layer of a thickness of about 1,000 A. The part 7 of the electrode 6 serves for establishing contacts.

If, by means of the battery 8 of the embodiment described above, a voltage of 10 v. with respect to the source electrode 3 is applied to the drain electrode 2 and a voltage of −1.3 v. with respect to the source electrode 3 is applied to the control-electrode 6, the current $I_D$ across the device is about 50μ A., while $g_m$ is about 0.5 ma./v. $g_m/I_D$, and an important quality defining numeral for devices of the kind according to the invention is about 10 $v.^{-1}$, whereas in a similar device having an insulating layer of constant thickness of about 1μ this value would be about 1 $v.^{-1}$.

Figure 3:
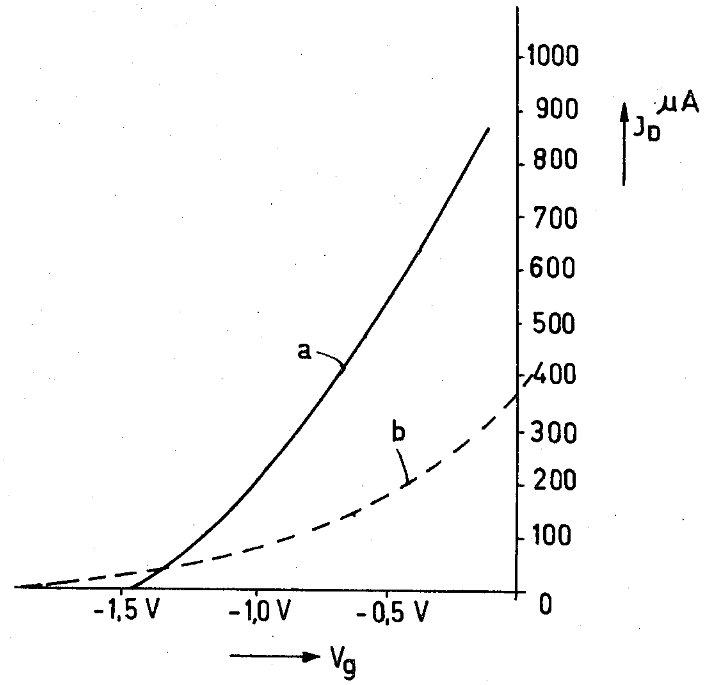
FIG. 3 is a current-voltage characteristic curve of the embodiment of FIGS. 1 and 2 and a current-voltage characteristic curve of a known device of the kind to which the invention relates.

FIG. 3 shows a characteristic curve of the device described above in which the potential $V_g$ of the control-electrode 6 is plotted against $I_D$. The curve *a* indicates $I_D$ in dependence upon $V_g$ in the device according to the invention and the curve *b* indicates a similar dependence in a corresponding, known device having a constant thickness of the insulating layer. The curve *a* is steeper with a given $I_D$ than the curve *b*, which means that in the device according to the invention a higher amplification can be obtained with low currents $I_D$, so that in addition heat dissipation is particularly low.

It should be noted that input signals can be applied to the device from a signal source 16, whereas output signals can be derived for a load 10 via the terminals 18.

If use is made of a p-type semiconductor body, a negative bias voltage and a positive bias voltage with respect to the electrode 3 have to be applied to the electrode 2 and to the electrode 6 respectively.

Figure 4:
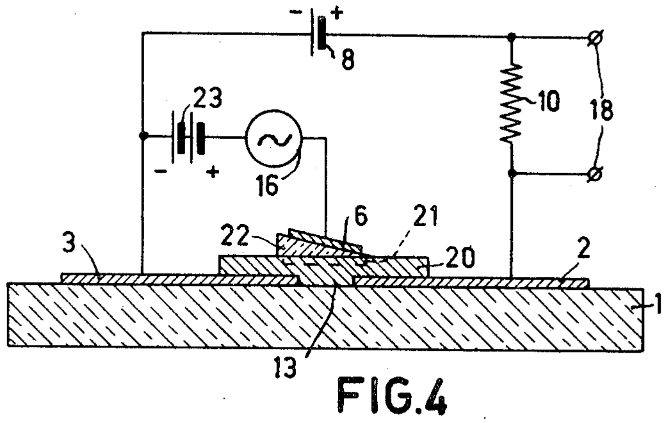
FIG. 4 shows diagrammatically and partly in a cross sectional view a second embodiment of a semiconductor device according to the invention.

FIG. 4 shows a second embodiment of a TFT according to the invention, which is fairly similar to the embodiment shown in FIGS. 1 and 2. Corresponding parts are designated by the same reference numerals.

In the present embodiment a semiconductor body 20, for example of cadmium sulphide, is used, which has a substantially intrinsic conductivity, for example low n-type conductivity. The layer resistance may be for example $10^8$ ohms/square. The connecting electrode 2, the drain electrode, is, like in the preceding embodiment, at a positive potential by means of the battery 8, with respect to the connecting electrode 3, the source electrode. The control-electrode 6 is also biassed positively with respect to the source electrode 3 by means of the battery 23, while the potential of the drain electrode 2 lies between that of the source electrode 3 and that of the control-electrode 6. As a result electrons are drawn to the surface of the semiconductor body 20 near the insulating layer 22, so that a surface layer 21 is formed which has an increased electron concentration and through which the current flows between the electrodes 2 and 3.

In order to facilitate the flow of current between the electrodes (2, 3) and the surface layer 21, an increased conduction by doping may be provided in the proximity of the electrodes (2, 3).

A constant thickness of the surface layer 21 and a constant field intensity in this layer are obtained by the substantially linearly increasing thickness of the insulating layer 22, which, in this case, exhibits the substantially linearly increasing thickness in the direction from the drain electrode 2 towards the source electrode 3.

The device shown in FIG. 4 may furthermore be made of the same materials as the device shown in FIGS. 1 and 2 and it may be manufactured by methods similar to those described with reference to FIGS. 1 and 2.

It wil be obvious that the invention is not restricted to the embodiments described above and that within the scope of the invention many variants may be carried out by those skilled in the art. The semiconductor bodies 4 and 20 of the FIGS. 1, 2 and 4 may be made of other semiconductor materials than cadmium sulphide, for example, of cadmium selenide, tellurium, zinc telluride, tin oxide, indium oxide or gallium arsenide. The insulating layer may be made of magnesium fluoride, for example, instead of silica.

What is claimed is:

1. A semiconductor device comprising a semiconductor body, a pair of spaced electrode connections to said body whereby when a voltage is applied therebetween a current passes through a layer-like portion of the semiconductor body between said electrodes, an electrically-insulating layer on said semiconductor body and overlying said layer-like current-carrying portion, and a control electrode on said electrically-insulating layer, said insulating layer having a graded thickness in a direction from one electrode to the other electrode.

2. A device as set forth in claim 1 wherein an insulating support is provided, and the semiconductor body comprises a layer of semiconductive material deposited on said support.

3. A device as set forth in claim 1 wherein the semiconductor body is homogeneously of the same conductivity type and including means for applying a voltage of such polarity across the electrodes to cause the flow of majority carriers from one electrode to the other and for applying a voltage to the control electrode to cause the device to operate in the depletion mode, said insulating layer increasing in thickness in substantially linear manner from the said one electrode to the other.

4. A device as set forth in claim 1 wherein the semiconductor body is of substantially intrinsic conductivity and including means for applying a voltage of such polarity across the electrodes to cause the flow of majority carriers from one electrode to the other and for applying a voltage to the control electrode to cause the device to operate in the enhancement mode, said insulating layer increasing in thickness in substantially linear manner from the said other electrode to the said one electrode.

5. A device as set forth in claim 1 wherein the difference in thickness of the insulating layer from one end to the other end is at least a factor of 2.

6. A device as set forth in claim 5 wherein the difference in thickness of the insulating layer from one end to the other end is at least a factor of 3 and at most a factor of 20.

References Cited

UNITED STATES PATENTS

| | | | |
|---|---|---|---|
| 2,951,191 | 8/1960 | Herzog | 317—235 |
| 3,321,680 | 5/1967 | Arndt et al. | 317—234 |
| 3,328,601 | 6/1967 | Rosenbaum | 307—88.5 |
| 3,339,128 | 8/1967 | Olmstead et al. | 317—235 |

JOHN W. HUCKERT, *Primary Examiner.*

R. SANDLER, *Assistant Examiner.*